(12) United States Patent  
Gupta et al.

(10) Patent No.: US 9,317,213 B1
(45) Date of Patent: Apr. 19, 2016

(54) EFFICIENT STORAGE OF VARIABLY-SIZED DATA OBJECTS IN A DATA STORE

(71) Applicant: Amazon Technologies, Inc., Reno, NV (US)

(72) Inventors: Anurag Windlass Gupta, Atherton, CA (US); Benjamin Tobler, Seattle, WA (US); Samuel James McKelvie, Seattle, WA (US); James McClellan Corey, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 13/892,027

(22) Filed: May 10, 2013

(51) Int. Cl.
*G06F 17/30* (2006.01)
*G06F 3/06* (2006.01)

(52) U.S. Cl.
CPC .................................... *G06F 3/064* (2013.01)

(58) Field of Classification Search
CPC .................. G06F 17/30067; G06F 17/30138; G06F 3/064
See application file for complete search history.

(56) References Cited

U.S. PATENT DOCUMENTS

| | | | |
|---|---|---|---|
| 5,280,612 A | | 1/1994 | Lorie et al. |
| 5,471,614 A | | 11/1995 | Kakimoto |
| 5,524,205 A | | 6/1996 | Lomet et al. |
| 5,530,850 A | | 6/1996 | Ford et al. |
| 5,613,105 A | * | 3/1997 | Zbikowski et al. |
| 5,758,360 A | * | 5/1998 | Zbikowski et al. |
| 5,870,758 A | | 2/1999 | Bamford et al. |
| 5,907,848 A | | 5/1999 | Zaiken et al. |
| 6,233,585 B1 | | 5/2001 | Gupta et al. |
| 6,240,413 B1 | | 5/2001 | Learmont |
| 6,615,219 B1 | | 9/2003 | Bruso et al. |
| 6,631,374 B1 | * | 10/2003 | Klein et al. ............... 707/638 |
| 6,732,171 B2 | | 5/2004 | Hayden |
| 6,832,229 B2 | | 12/2004 | Reed |
| 6,976,022 B2 | | 12/2005 | Vemuri et al. |
| 7,010,645 B2 | * | 3/2006 | Hetzler et al. ............ 711/113 |

(Continued)

FOREIGN PATENT DOCUMENTS

EP 0675451 10/1995

OTHER PUBLICATIONS

"Amazon Web Servies Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Shiow-Jy Fan
(74) *Attorney, Agent, or Firm* — Robert C. Kowert; Meyertons, Hood, Kivlin, Kowert & Goetzel, P.C.

(57) ABSTRACT

Variably-sized data objects may be received for storage at a data store. The data store may have a minimum write size. In various embodiments, received data objects may be divided into one or more equally-sized portions that equal the minimum write size of the data store and a remainder of the data object. The one or more equally-sized portions of the data object may be stored in data blocks that are equivalent to the minimum write size of the data store in a fixed-size data storage area of the data store. The remainder of the data object may be stored in a variably-sized data storage area of the data store along with one or more other data portions in a same data block. The remainder of the data object may, in some embodiments, be linked to the one or more equally-sized portions of the data object.

20 Claims, 10 Drawing Sheets

(56) References Cited

U.S. PATENT DOCUMENTS

| | | | |
|---|---|---|---|
| 7,089,253 | B2 | 8/2006 | Hinshaw et al. |
| 7,146,386 | B2 | 12/2006 | Xiao |
| 7,305,386 | B2 | 12/2007 | Hinshaw et al. |
| 7,308,456 | B2 | 12/2007 | Friske et al. |
| 7,716,645 | B2 * | 5/2010 | Dolby et al. ............ 717/126 |
| 7,747,663 | B2 | 6/2010 | Atkin et al. |
| 7,885,922 | B2 | 2/2011 | Pareek et al. |
| 7,930,271 | B2 | 4/2011 | Tarbell |
| 7,937,551 | B2 | 5/2011 | Schott |
| 7,979,670 | B2 | 7/2011 | Saliba et al. |
| 8,140,821 | B1 * | 3/2012 | Raizen et al. ............ 711/202 |
| 8,209,515 | B2 | 6/2012 | Schott |
| 8,255,627 | B2 | 8/2012 | Blinick et al. |
| 8,266,114 | B2 | 9/2012 | Mace et al. |
| 8,271,830 | B2 | 9/2012 | Erofeev |
| 8,289,801 | B2 | 10/2012 | Smith et al. |
| 8,301,670 | B2 | 10/2012 | Revah et al. |
| 8,326,897 | B2 | 12/2012 | Butterworth et al. |
| 8,341,128 | B1 | 12/2012 | Ruggiero |
| 8,370,715 | B2 | 2/2013 | Hafner et al. |
| 8,380,670 | B2 | 2/2013 | Kuber et al. |
| 8,392,479 | B1 | 3/2013 | Pantin |
| 8,396,831 | B2 | 3/2013 | Larson et al. |
| 8,412,689 | B2 | 4/2013 | Reid et al. |
| 8,412,752 | B2 | 4/2013 | Dodge |
| 8,429,121 | B2 | 4/2013 | Pareek et al. |
| 2002/0107835 | A1 | 8/2002 | Coram et al. |
| 2002/0143733 | A1 | 10/2002 | Mukkamalla et al. |
| 2004/0133622 | A1 | 7/2004 | Clubb et al. |
| 2004/0249869 | A1 | 12/2004 | Oksanen |
| 2007/0266037 | A1 * | 11/2007 | Terry et al. ............ 707/100 |
| 2008/0183973 | A1 | 7/2008 | Aguilera et al. |
| 2009/0228511 | A1 * | 9/2009 | Atkin et al. ............ 707/102 |
| 2010/0050172 | A1 | 2/2010 | Ferris |
| 2010/0157641 | A1 * | 6/2010 | Shalvi et al. ............ 365/45 |
| 2010/0192131 | A1 | 7/2010 | Dolby et al. |
| 2011/0035548 | A1 | 2/2011 | Kimmel et al. |
| 2011/0161496 | A1 | 6/2011 | Nicklin |
| 2012/0041899 | A1 | 2/2012 | Greene et al. |
| 2012/0174112 | A1 | 7/2012 | Vaidya et al. |
| 2012/0191648 | A1 | 7/2012 | Kuber et al. |
| 2012/0297073 | A1 | 11/2012 | Glover et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2013/0036281 | A1 | 2/2013 | Revah et al. |
| 2013/0042156 | A1 | 2/2013 | Srinivasan et al. |
| 2013/0080386 | A1 | 3/2013 | Dwyer et al. |
| 2013/0080388 | A1 | 3/2013 | Dwyer et al. |
| 2013/0086129 | A1 | 4/2013 | Brown et al. |

OTHER PUBLICATIONS

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11 g-SQL-Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

"Isolation (database systems)" downloaded from http://en.wikipedia.org/wiki/Isolation_(database_systems) on May 15, 2013, pp. 1-7.

U.S. Appl. No. 13/873,467, filed Apr. 20, 2013, Anurag Windlass Gupta.

U.S. Appl. No. 13/902,381, filed May 24, 2013, Anurag Windlass Gupta.

U.S. Appl. No. 13/893,004, filed May 13, 2013, Laurion Darrell Burchall.

U.S. Appl. No. 13/901,111, filed May 23, 2013, Anurag Windlass Gupta.

U.S. Appl. No. 13/894,969, filed May 25, 2013, Grant Alexander MacDonald McAlister.

U.S. Appl. No. 13/903,674, filed May 28, 2013, Anurag Windlass Gupta.

* cited by examiner

EFFICIENT STORAGE OF VARIABLY-SIZED DATA OBJECTS IN A DATA STORE

BACKGROUND

Fragmentation, or inefficient use of data storage, is one of many problems for systems that manage and store data. Various strategies exist to reduce fragmentation, however, often each strategy creates as many problems as it solves. One strategy is to store data objects in equally-sized chunks of data. Instead of placing the burden of managing available storage space upon a user, client, or other system or application, each storage location may instead be understood to be full or not full. Thus, fragmentation that occurs when an entire data chunk is not used remains internal and hidden from a user, client, or other system or application by design. Moreover, the amount of fragmentation may be limited to less than the amount of a data chunk for each partially full data chunk. Conversely, another strategy to combat fragmentation stores data objects in chunks of data equivalent to their size, creating different sizes for variably-sized data objects. However, as data is used and reclaimed over time, smaller chunks may become unusable even if empty as their capacity to store a larger data object is limited.

As data storage needs increase, along with the needs to replicate stored data in order to provide greater data security and reliability, the problems presented by data fragmentation compound. Storing greater numbers of data objects increases the amount of fragmentation, which in turn wastes storage resources and increases the costs of maintaining data storage. Moreover, the burden of managing data storage often falls disproportionately on the user, the client, the system, the application, or the provider of data storage.

Figure 1:
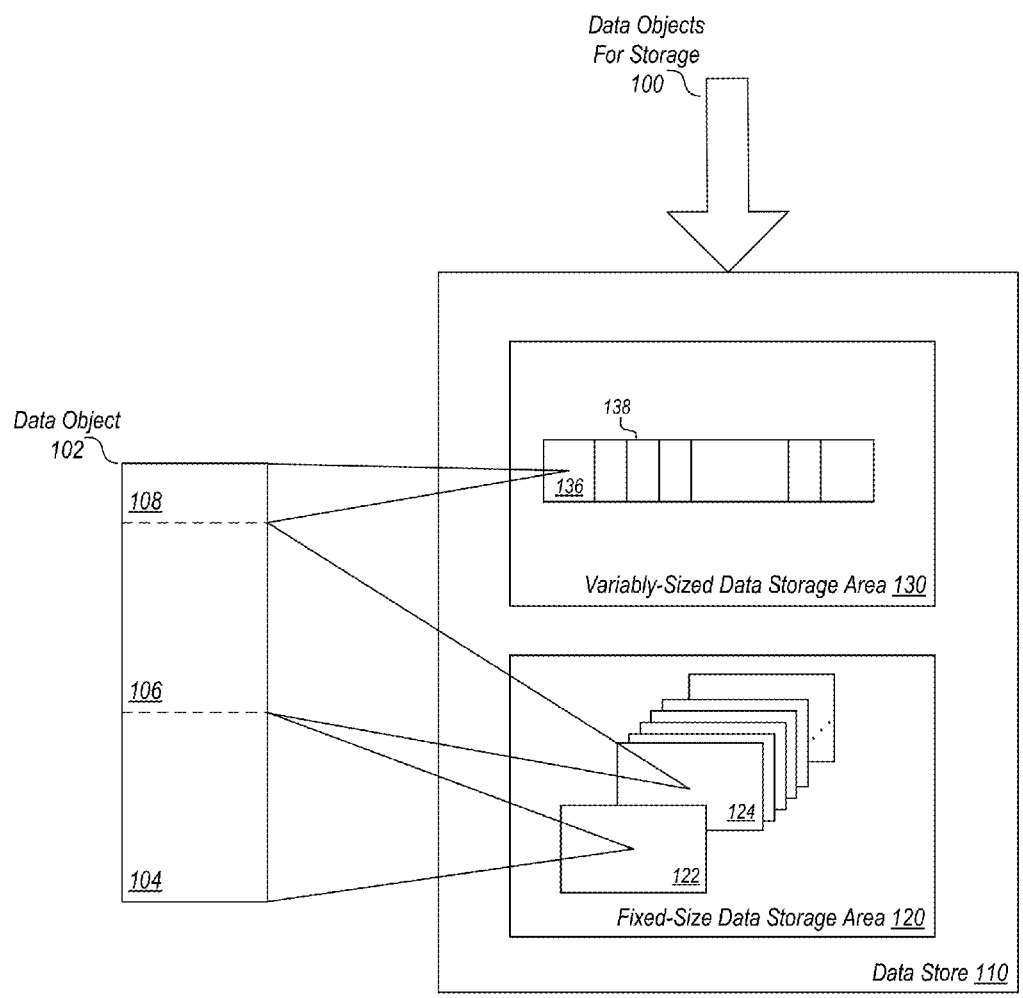
FIG. 1 is a block diagram illustrating efficient storage of variably-sized data objects, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of efficiently storing variably-sized data objects are disclosed. A data store, such as data storage for a database or a storage node of a distributed storage system may, in some embodiments, store data objects at a data store. The data store may have a minimum write size. In various embodiments, received data objects may be divided into one or more equally-sized portions that equal the minimum write size of the data store and a remainder of the data object. Then the one or more equally-sized portions of the data object may be stored in data blocks that are equivalent to the minimum write size of the data store in a fixed-size data storage area of the data store. The remainder of the data object may be stored in a variably-sized data storage area of the data store along with one or more other data portions in a same data block. The remainder of the data object may, in some embodiments, be linked to the one or more equally-sized portions of the data object.

The specification first describes an example of efficiently storing variably-sized data objects in a data store. A distributed storage service, such as a distributed storage service implemented as part of various web services, may be configured to implement efficiently storing variably-sized data object techniques. Included in the description of the example distributed storage are various aspects of the distributed storage service, such as a storage node, as well as various other services with which a distributed storage service may interact, such as a database service. The specification then describes flowcharts of various embodiments of methods for efficiently storing variably-sized data objects in a data store. Then, the specification describes an example system that may implement the disclosed techniques. Throughout the specification a variety of different examples may be provided.

A data store or other form of data storage that stores multiple data objects may routinely suffer from fragmentation (wasted or unused storage space) within the data store. Typically, fragmentation may be caused when data blocks or other portions of a data store are only partially filled with data to be stored in the data block, for example, when a 3 kilobyte data object is stored in a 4 kilobyte data block, the remaining 1 kilobyte is wasted. Alternatively, fragmentation may also be caused when available storage space is too small or improperly formatted for storing data that needs to be stored. In each of these described scenarios, data objects that have different sizes may result in fragmentation.

FIG. 1 illustrates efficient storage of variably-sized data objects, according to some embodiments. Various data objects 100 may be received at data store 110 for storage. These data objects 100 may be stored for a variety of different reasons, such as storing data for a database or storing files in a file system. These data objects 100 may be of various sizes and types. For example, data objects may be compressed versions of other data objects or any other form, structure, or logical arrangement of data to be stored. In some embodiments, a variously-sized data object may be a data object that is not exactly divisible into a minimum write size of a data store. For example, if a data object is 16 kilobytes and a minimum write size of a data store is a 4 kilobytes, then the data object is exactly divisible into 4 kilobytes (i.e. with no remainder). However, if a data object is 14 kilobytes, then the data object is not exactly divisible into 4 kilobytes (as there is a remainder of 2 kilobytes). This 14 kilobyte data object may then be considered variably-sized. Data objects 100 may or may not be variably-sized data objects. However, in at least some embodiments, data objects 100 that are not variably-sized may be modified in such a way that they become variably-sized. For instance, the 16 kilobyte data object from the example above may be compressed into a 7 kilobyte size data object, which may be variably-sized.

A data store 110 may receive these various data objects for storage. A data store may be a specific persistent storage device, such as a mechanical storage device (e.g., hard disk drive), a non-mechanical storage device (e.g., solid state drive), or configuration of multiple storage devices (e.g., redundant array of disks (RAID)), configured to persist data objects received for storage at a data store 110. When writing data to storage in data store 110, data store 110 may be configured to perform a write in a minimum write size. This minimum write size may be the largest portion of data that may be written by the data store atomically, such that the write either occurs or does not occur. A data store may be configured to store data in data blocks that are equivalent to the minimum write size. For instance, if the data store may atomically write 4 kilobytes of data at once, then the data blocks in which data may be stored may also be 4 kilobytes in size.

In at least some embodiments, data store 110 may implement a fixed-size data storage area 120. Fixed size data storage area 120 may store data in data blocks of a fixed size independent of the size the data being stored in the data block. For instance, for a 3 kilobyte size data object stored in the fixed-size data storage area 120, a 4 kilobyte data block may be used to store all data in the fixed-size data storage area, leaving a 1 kilobyte of the data block storing the 3 kilobyte data object unused. In various embodiments, data store 110 may also implement a variably-sized data storage area 130. Variably-sized data storage area 130 may store data in data blocks in such a way that data objects are stored contiguously, even if the data object may cross the boundaries between data blocks. For example, if a 3 kilobyte data object is stored in a 4 kilobyte data block, then 1 kilobyte is left unused. When another data object is added to the variably-sized data storage area 130, such as 5 kilobyte data object, then the remaining 1 kilobyte may store 1 kilobyte of the 5 kilobyte data object and while a contiguous data block may store the remaining 4 kilobytes. Thus, in a variably-sized data store, a data block may store different data portions for multiple data objects in the same data block.

Various techniques or embodiments of efficiently storing variably-sized data may be implemented in a data store, such as data store 110. For instance, data object 102 is an example of one of the various data objects 100 that may be received for storage in data store 110, such as a variably-sized data object or an object that has been modified (e.g., compressed) to be a variably-sized data object. Data object 102 may be divided into one or more equally-sized portions, portions 104 and 106. These portions may be equivalent to the minimum write size of data store 110. Thus, for instance, if the minimum write size of data store 110 is 4 kilobytes, then the size of each equally-sized portion, 104 and 106, may be 4 kilobytes. As a result of dividing data object 102 into equally-sized portions that are equivalent to the minimum write size of data store 110, a remainder of data object 108 may be created.

The equally-sized portions 104 and 106 of the data object 102 may be stored in respective data blocks in the fixed-size data storage area 120. As noted above, fixed size data storage area 120 may store data in multiple data blocks, as illustrated in FIG. 1. Equally-sized portion 104 may be stored in data block 122 and equally-sized portion 106 may be stored in data block 124. The remainder 108 of data object 102 may be stored in a data block 138 in variably-sized data storage area 130. The remainder 108 may be stored in part 136 of data block 138. However, data block 138, such as illustrated in FIG. 1, may also include other data portions in the same data block. In at least some embodiments, remainder 108 stored in part 136 of data block 138 may be linked to equally-sized portions 104 and 106 stored in data blocks 122 and 124 in fixed-size data storage area 120. Such a link may, in some embodiments, allow data object 102 to be reconstructed upon a request for access of data object 102 (e.g., a read request, write request, etc.). This link may be included with remainder 108 in part 136, such as a pointer, address, or some other identifier of the locations of equally-sized portions 104 and 106. Alternatively, in some embodiments it may be determined whether remainder 108 exceeds a remainder efficiency threshold. If the remainder efficiency threshold is exceeded, then remainder 108 may be stored in a data block in fixed data storage area 120 instead of variably-sized data storage area 130.

Please note that the examples and discussion given above with regard to be FIG. 1 are not intended to be limiting as to other arrangements, methods, or techniques to implement efficient storage of variably-sized data objects. FIG. 1 may describe logical arraignments of data in a data store and may not describe the physical storage of data in a data store or other persistent data storage device.

As discussed above, many different types of systems that implement a data store may implement the various embodiments of efficient storage of variably-sized data objects. In the following discussion, examples are given of various devices and or systems that may implement different embodiments. For example, in some embodiments, a web service may enable clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

These systems may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, the database service may be responsible for receiving SQL requests from end clients through a JDBC or ODBC interface and for performing SQL processing and transaction management (which may include locking) locally. However, rather than generating data pages locally, the database service (or various components thereof) may generate redo log records and may ship them to the appropriate nodes of a separate distributed storage system. In some embodiments, a client-side driver for the distributed storage system may be hosted on a database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database service may support the use of synchronous or asynchronous read replicas in the system, e.g., read-only copies of data on different nodes of the database service to which read requests can be routed. In such embodiments, if a database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, a client-side driver running on a database engine head node may expose a private interface to the storage service. In some embodiments, it may also expose a traditional iSCSI interface to one or more other components (e.g., other database engines or virtual computing services components). In some embodiments, storage for a database instance in the storage service may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, a client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, because accesses to log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
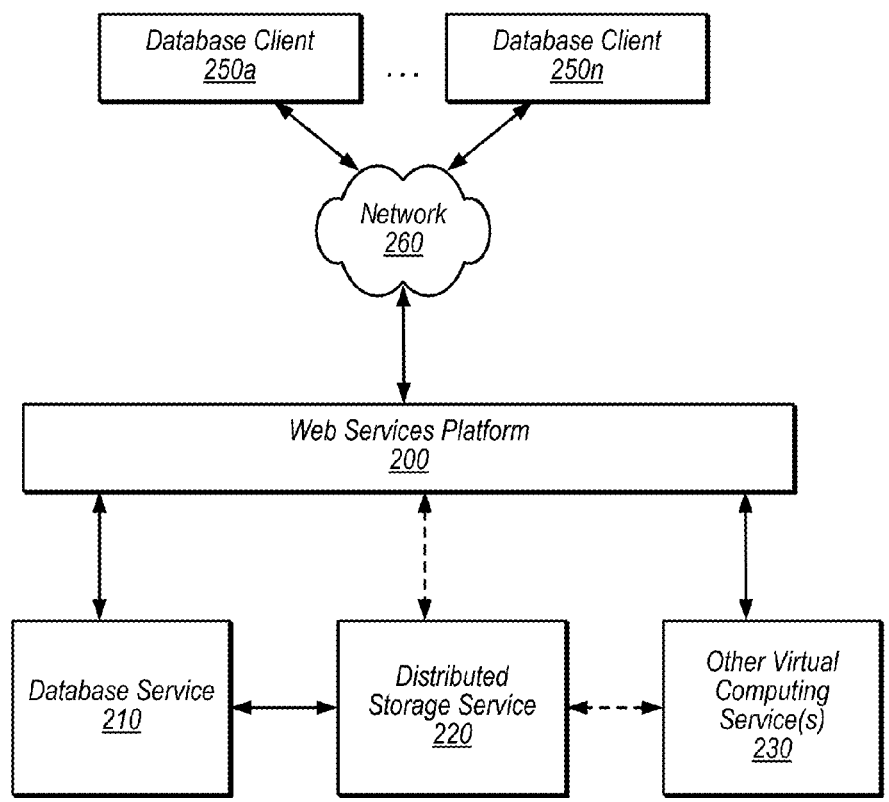
FIG. 2 is a block diagram illustrating an example operating environment for a distributed storage service, according to some embodiments.

An example of a service system architecture that may be configured to implement a web services-based database service is illustrated in FIG. 2. In the illustrated embodiment, a number of clients (shown as database clients 250a-250n) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, database clients 250 may encompass any type of client configurable to submit web services requests to web services platform 200 via network 260, including requests for database services (e.g., a request to generate a snapshot, etc.). For example, a given database client 250 may include a suitable version of a web browser, or may include a plug-in module or other type of code module configured to execute as an extension to or within an execution environment provided by a web browser. Alternatively, a database client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, database client 250 may be an application configured to interact directly with web services platform 200. In some embodiments, database client 250 may be configured to generate web services requests according to a Representational State Transfer (REST)-style web services architecture, a document- or message-based web services architecture, or another suitable web services architecture.

In some embodiments, a database client 250 (e.g., a database service client) may be configured to provide access to web services-based storage of database tables to other applications in a manner that is transparent to those applications. For example, database client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. The details of interfacing to Web services platform 200 may be coordinated by database client 250 and the operating system or file system on behalf of applications executing within the operating system environment.

Database clients 250 may convey web services requests (e.g., a snapshot request, parameters of a snapshot request, read request, restore a snapshot, etc.) to and receive responses from web services platform 200 via network 260. In various embodiments, network 260 may encompass any suitable combination of networking hardware and protocols necessary to establish web-based communications between database clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given database client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given database client 250 and the Internet as well as between the Internet and web services platform 200. It is noted that in some embodiments, database clients 250 may communicate with web services platform 200 using a private network rather than the public Internet. For example, database clients 250 may be provisioned within the same enterprise as a database service system (e.g., a system that implements database service 210 and/or distributed database-optimized storage service 220). In such a case, database clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). Data objects, such as data objects 100 discussed above with regard to FIG. 1 may also be received, created, modified, or manipulated as part of processing these web-services requests. For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from database clients 250 and to forward them to components of a system that implements database service 210, distributed storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting database clients 250, the number and/or frequency of client requests, the size of data tables (or records thereof) stored or retrieved on behalf of database clients 250, overall storage bandwidth used by database clients 250, class of storage requested by database clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from database clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to database clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the database client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a database client 250 does not have sufficient credentials to access the particular database table, platform 200 may reject the corresponding web services request, for example by returning a response to the requesting database client 250 indicating an error condition. Various access control policies may be stored as records or lists of access control information by database service 210, distributed database-optimized storage service 220 and/or other virtual computing services 230.

It is noted that while web services platform 200 may represent the primary interface through which database clients 250 may access the features of a database system that implements database service 210, it need not represent the sole interface to such features. For example, an alternate application programming interface (API) that may be distinct from a web services interface may be used to allow clients internal to the enterprise providing the database system to bypass web services platform 200. Note that in many of the examples described herein, distributed storage service 220 may be internal to a computing system or an enterprise system that provides database services to database clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed storage service 220 in storing database tables on behalf of database clients 250 may be transparent to those clients. In other embodiments, distributed database-optimized storage service 220 may be exposed to database clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a database client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

In some embodiments, the distributed storage systems described herein may organize data in various logical volumes, segments, and pages for storage on one or more storage nodes. For example, in some embodiments storing data for a database table, each database table is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. In at least some embodiments, a change log may be a variably-sized data storage area, such as variably-sized data storage area 130 described above with regard to FIG. 1, and the collection of data pages in a segment may be a fixed-size data storage area, such as fixed-size data storage area 120 also discussed above with regard to FIG. 1. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). This coalesce operation may create a new data object that is variably-sized. In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 3:
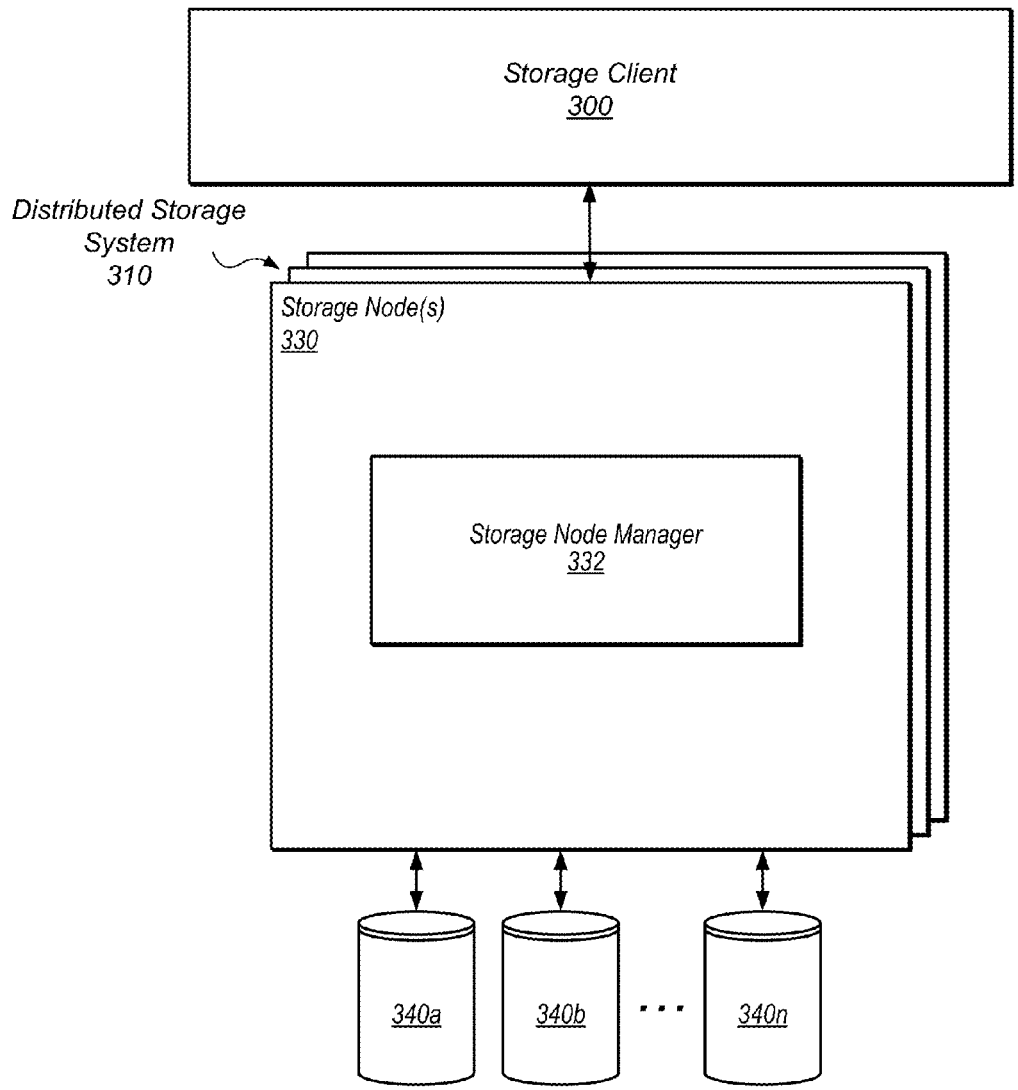
FIG. 3 is a block diagram illustrating a distributed storage system, according to some embodiments.

One embodiment of a distributed storage system is illustrated by the block diagram in FIG. 3. In this example, storage client 300 may be a database system or other device, program, system, or application that may provide data to distributed storage system 310 for storage. Storage client 300 may communicate with one or more storage nodes 330 of distributed storage system 310 over a network, such as network 260 in FIG. 2, or other method form of external or internal communication. In this example, distributed storage system 310 includes multiple storage nodes, each of which may include storage for a storage client. For example, if storage client is a database service similar to database service 210 described above with regard to FIG. 2, data pages and redo logs for segments may be stored on one or more storage nodes 330. Storage nodes may implement a variety of different hardware and/or software components to perform various management functions for data stored on the storage node.

In at least some embodiments, storage node 330 may include a storage node manager 332 which may perform the various techniques and methods to efficiently store variably-sized data objects, either those received from a storage client directly, or those created, modified, or managed by storage node manager 332 as part of the various management functions to manage data stored at the storage node, according to the various techniques and methods described below with regard to FIGS. 5-8. For instance, storage node manager 332 may receive a data object for storage at the storage node. This data object may be data received from a storage client 300 or generated by one or more management functions or operations by the storage node 330 (e.g., a log record created in response to a write request to data stored at the storage node). The data object may be variably-sized, such that it is not exactly divisible by the minimum write size of persistent storage devices 340a-340n. The data object may be divided into one or more equally-sized portions. Each of these equally-sized portions may equal the minimum write size of persistent data storage devices 340a-340n. As a result of the division, a remainder of the data object may also be created. The equally-sized portions of data may each be stored in a respective data block of a fixed-size data storage area on a persistent data storage device 340a. The remainder of the data object may be stored in the variably-sized data storage area on persistent data storage device 340a (although not limited to the same storage device as in some embodiments a variably-sized data storage area may be on a different storage device). In some embodiments, storage nodes 330 may implement a log structured storage system and other log records may be stored in a same data block as a remainder of a data object.

In various embodiments, each storage node may also have multiple attached persistent data storage devices, 340a-340n, (e.g., SSDs) on which data blocks may be stored on behalf of storage clients (e.g., users, client applications, and/or database service subscribers). Note that the label "SSD" may or may not refer to a solid-state drive, but may more generally refer to a local block storage volume, regardless of its underlying hardware. Such devices may be implemented by various storage device technologies, such as mechanical storage devices (e.g., hard disk drives) or non-mechanical storage devices (e.g., flash-based storage devices). In some embodiments, a persistent data storage device, 340a-340n, may have a minimum write size (also sometimes referred to as a sector or sector size). This minimum write size may be the unit of alignment on a persistent storage device, such that blocks storing data on the device may be equivalent to the minimum write size. As discussed above, a minimum write size on a persistent storage device may be an amount of data that can be written atomically by the persistent storage device, that is without the risk that the write will only be partially completed. For example, the minimum write size for various solid-state drives and spinning media may be 4 KB. In some embodiments of the distributed storage systems described herein, data blocks may include metadata, such as a 64-bit (8 byte) CRC, at the beginning of the data block, regardless of the higher-level entity (e.g., data page) of which the data block is a part. In such embodiments, this CRC (which may be validated every time a sector is read from SSD) may be used in detecting corruptions. In some embodiments, this metadata may also include a "block type" byte whose value identifies the block as a block for variably-sized data storage (e.g., log data block) or as a block for fixed-size data storage (e.g., fixed-size data block), or an uninitialized block. For example, in some embodiments, a block type byte value of 0 may indicate that the block is uninitialized.

In some embodiments, each of the storage system server nodes in the distributed storage system may implement a set of processes running on the node server's operating system that manage communication with storage client 300, such as the database service 210 in FIG. 2 (e.g., to receive redo logs, send back data pages, etc.). In some embodiments, all data blocks written to the distributed storage system 310 may be backed up to long-term and/or archival storage (e.g., in a remote key-value durable backup storage system).

A variety of different allocation models may be implemented for a persistent storage device, such as persistent storage devices 340a-340n, in different embodiments. For example, in some embodiments, data blocks for a variably-sized storage area and data blocks for a fixed-sized storage area may be allocated from a single heap of data blocks (or groups of data blocks such as pages) associated with a persistent storage device. This approach may have the advantage of leaving the relative amount of storage consumed by fixed-sized data storage and variably-sized data storage to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 4 and described below.

Figure 4:
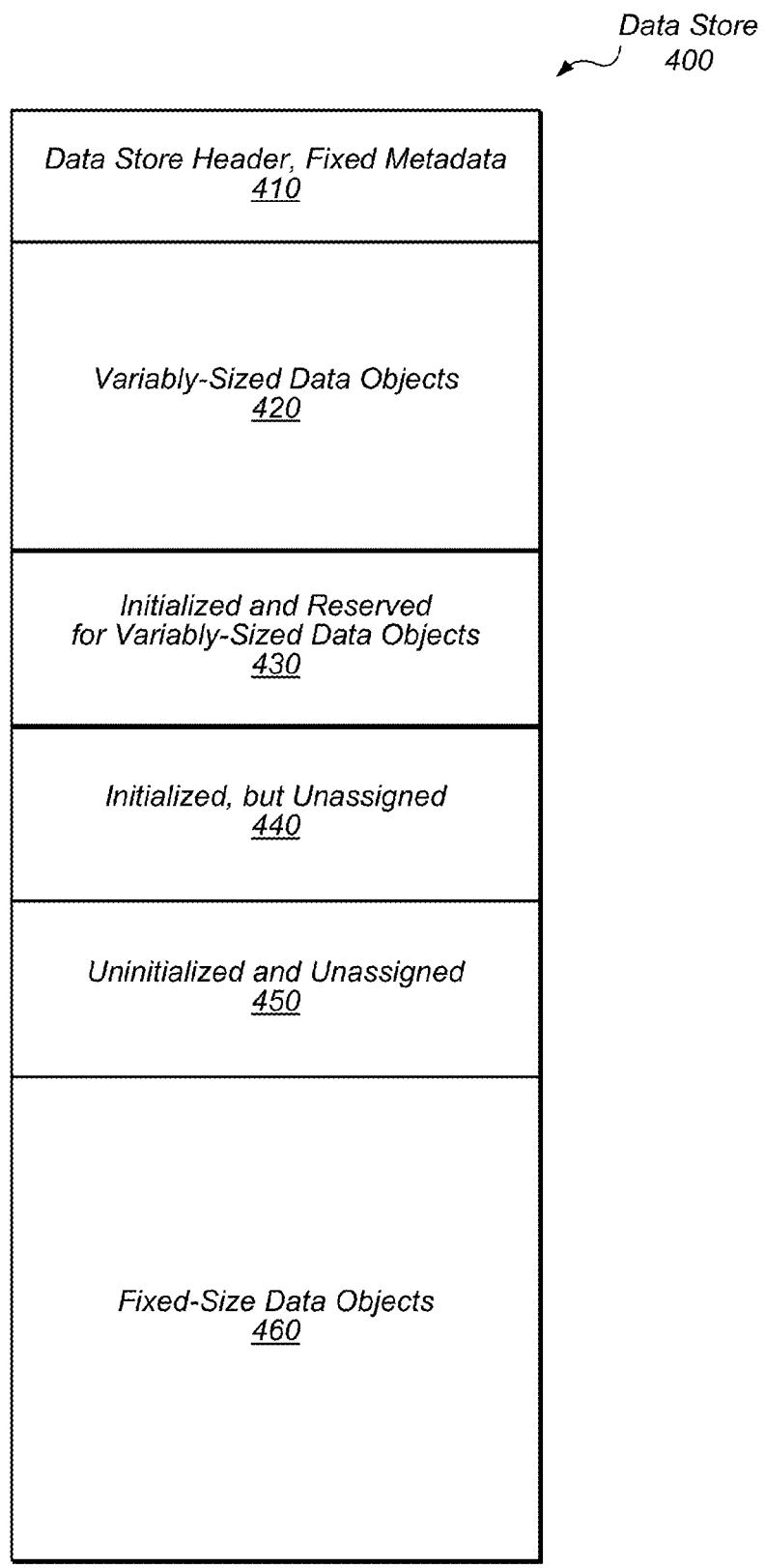
FIG. 4 is a block diagram illustrating an example data store implementing efficient storage of variably-sized data objects, according to some embodiments.

FIG. 4 is a block diagram illustrating how data and metadata may be stored on a data store, such as on a given storage node (e.g., on a persistent storage device attached to the storage node) of a distributed storage system, according to some embodiments. Data store 400 may store a header and other fixed metadata in the portion of the space labeled 410. It may store variably-sized data objects (e.g., redo or other log records, remainders of data objects, or any other portion of data) in the portion of the space labeled 420, and includes a space labeled 430 that is initialized and reserved for additional data blocks to store variably-sized data objects. One portion of data store 400 (shown as 440) is initialized, but unassigned, and another portion of the space (shown as 450) is uninitialized and unassigned. Finally, the portion of data store 400 labeled 460 stores fixed size-data objects.

In allocation approach illustrated in FIG. 4, variably-sized data objects may be packed into the beginning of the flat storage space. Holes that open up due to objects, or portions of objects, being freed may be reused before additional storage space farther into the address space are used. A reclamation process may be performed when a certain percentage or proportion of data blocks or groups of data blocks (e.g. pages) are freed. In some embodiments, this reclamation process of rebalancing/reclaiming variably-sized space may be performed as a background task.

In the example illustrated in FIG. 4, the current variably-sized data object storage area includes the area between the first usable data block of 420 and the last reserved data block of 430. In some embodiments, this pool may safely grow up to the last data block of the initialized but unassigned portion 440 without re-initialization of new data blocks as data blocks storing data for variably-sized data objects (e.g., by persisting an update to a pointer that identifies the last reserved data block). In this example, beyond the last usable data block in 640, the pool of data blocks for variably-sized data storage may grow up to the first used data block of fixed-size data objects 460 by persisting initialized data blocks for variably-sized data objects and persistently updating a pointer for the last usable data block. In this example, the previously uninitialized and unassigned portion of data store 400 shown as 450 may be pressed into service to store variably-sized data pages. Similarly, the pool of data blocks for variably-sized data objects may shrunk by setting a pointer to an earlier location in the data store 400.

In the example illustrated in FIG. 4, the current area of the fixed-size data storage area of data blocks for fixed-sized data storage includes the area between the last usable data block for variably-sized data objects at the end of 440 and the end of data store 400. In some embodiments, the data block pool for fixed-size data storage may be safely grown to the position identified by a pointer to the last reserved data block for variably-sized data objects at the end of 430 by persisting an update to the pointer to the last usable data block for variably-sized data objects. In this example, the previously initialized, but unassigned portion of the data store 400 shown as 440 may be pressed into service to store data blocks for the fixed-size data storage area.

In various embodiments, garbage collection may be performed for those data blocks storing data for the variably-size data storage area, 420, etc. . . . . For example, in some embodiments the variably-size data storage area 420 may be implemented as a log structure. Garbage collection may be done to reclaim space occupied by obsolete log records, e.g., log records that no longer need to be stored or persisted. For example, a log record may become obsolete when there is a subsequent record for the same data object and the version of the data object represented by the log record is not needed for retention. In some embodiments, a garbage collection process may reclaim space by merging two or more adjacent log pages (groups of data blocks storing log records) and replacing them with fewer new log pages containing all of the non-obsolete log records from the log pages that they are replacing. After the write of these new log pages is complete, the replaced log pages may be added to the free data block pool for the variably-sized data storage area 420.

Please note, that the above locations illustrated and discussed above may, in some embodiments, refer to logical arrangements or descriptions of data stored in the data stored. Physical arrangements and/or storage locations may differ from those shown, and as such the previous description regarding the allocation of data blocks is not intended to be limiting.

Figure 5:
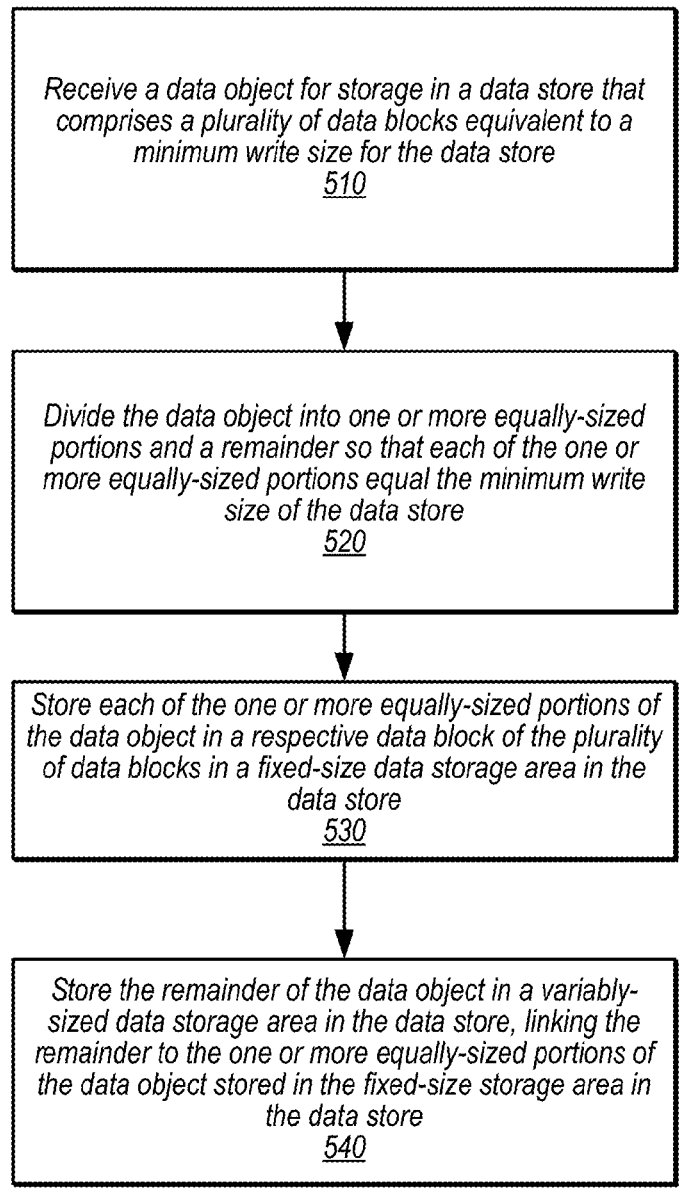
FIG. 5 is a high-level flowchart of a method to implement efficient storage of variably-sized data objects, according to some embodiments.
Figure 6A:
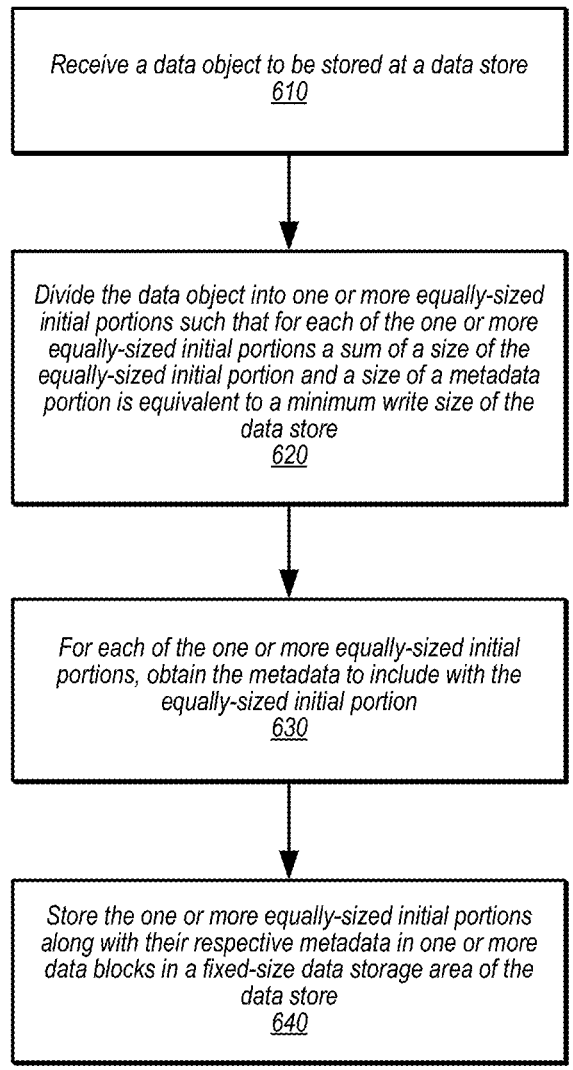
FIG. 6A is a high-level flowchart of a method to divide a data object into equally-sized portions including metadata, according to some embodiments.
Figure 6B:
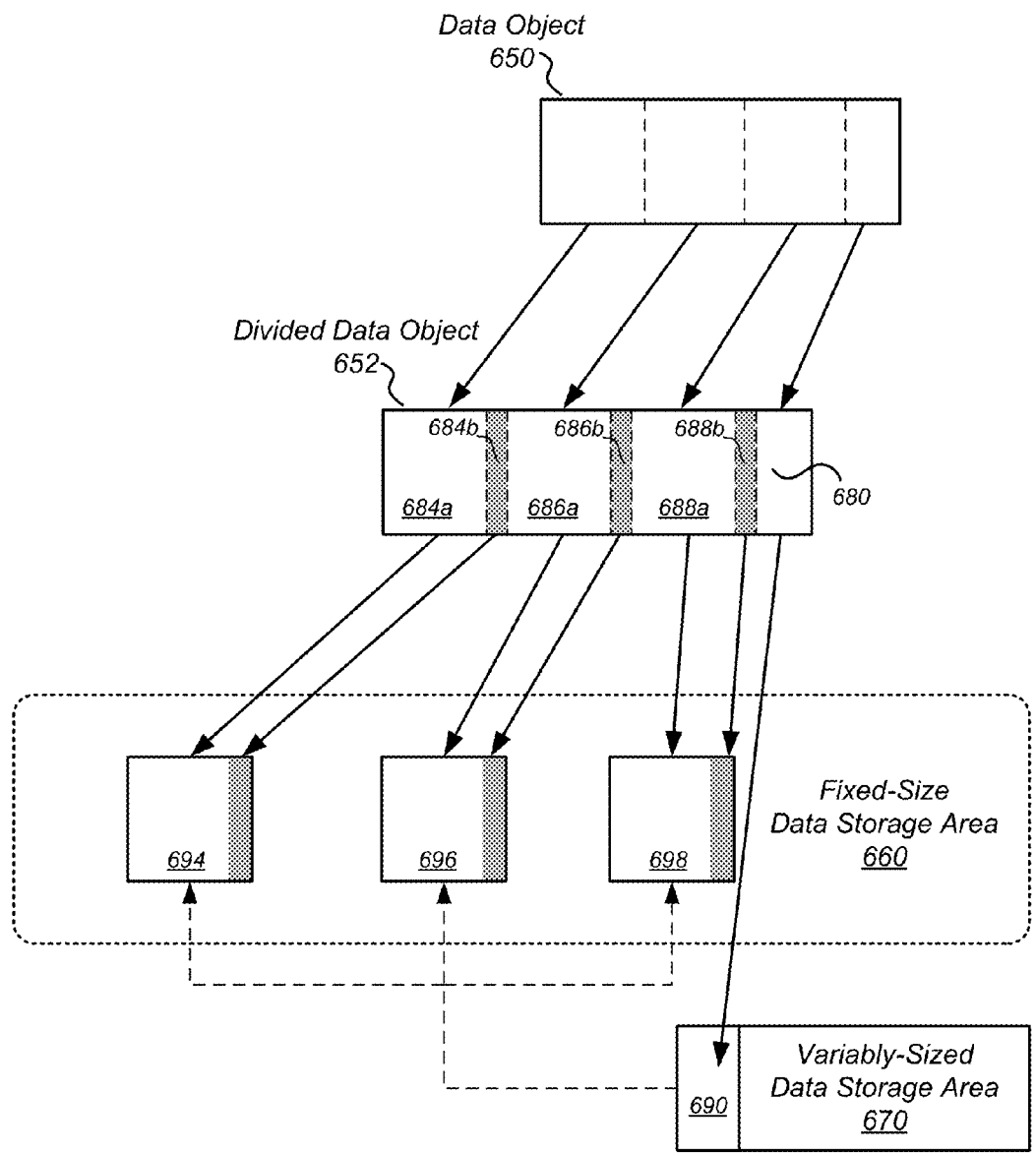
FIG. 6B is a block diagram illustrating equally-sized portions of a divided data object including metadata, according to some embodiments.

FIG. 5 is a high-level flowchart of a method to implement efficient storage of variably-sized data objects, according to some embodiments. As indicated at 510, a data object may be received for storage in a data store. This received data object may be received as a result of other processing or modification of data for the data object. For example, FIG. 7, described in further detail below, illustrates that the data object may a compressed data object that is generated from data received for the data object. The data store, as discussed above may include a plurality of data blocks (sometimes referred to as sectors) equivalent to a minimum write size for the data store. For instance, if the minimum write size for the data store is 4 kilobytes, then the plurality of data blocks may be 4 kilobytes. The data object may then be divided into one or more equally-sized portions and a remainder, as indicated at 520. The equally-sized portions of the data object may each equal the minimum write size of the data store. Continuing with the example above, if a data object of 15 kilobytes is received, then it may be divided into three equally-sized portions, 4 kilobytes each, that match the minimum write size of the data store. A remainder of 3 kilobytes is also created from the division. In some embodiments, the equally-sized portions of the data object may include other data in addition to data from the data object, such as metadata describing the type of data block, error detection data, such as a CRC, time stamp, block type, source identifier, or some other form of metadata. The sum of the size of the additional data, such as metadata and the data from the data object may be equal to the minimum write size of the data store. FIGS. 6A and 6B provide further discussion of the various techniques in which this may be performed.

In various embodiments, the one or more equally-sized portions of the data object may each be stored in a respective data block in a fixed-size data storage area in the data store, as indicated at 530. Thus, in the above example the 4 kilobyte portions of the data object may be stored in the 4 kilobyte data blocks of the fixed-size data storage area, such as the storage area 460 in the data store discussed above with regard to FIG. 4. This may ensure that data stored in the fixed-size data storage area is efficiently stored by reducing fragmentation within the data blocks. The remainder of the data object may be stored in the variably-sized data storage area in the data store, as indicated at 540. As discussed above, a variably-size data storage area may also store data in data blocks equivalent to the minimum write size of the data store. However, unlike the fixed-size data storage area, other portions of data, such as other remainders, records, data objects, etc., may be stored in the same data block as the remainder. This may allow, in at least some embodiments, for the data blocks to be efficiently utilized by reducing fragmentation within the data blocks of the variably-sized data storage area.

In at least some embodiments, the remainder of the data object in the variably-size data storage area may be linked to the equally-sized portions of the data object in the fixed size storage area. For instance, a pointer or pointers may provide addresses/locations of the data blocks storing the equally-sized portions of data. This link may be stored with the remainder in the variably-sized data storage area. Alternatively, mapping information or some other record of the associations or links between data in the fixed-size data storage area and the variably-sized data storage area may be maintained. The linking between the remainder and the one or more equally-sized portions of the data object may allow the data object to be reconstructed in response to various access requests, such as requests, to read, write to, or otherwise modify the data object. For example, a database service, such as database system 210 in FIG. 2, may wish to modify a portion of data for a database that it manages and that is stored in the data store. A write request to change the value of the data may be processed and the data object may need to be reconstructed prior to writing the new value. Metadata, such as a CRC, source identifier, block type, etc., may also be stored along with the remainder in the variably-sized data storage area.

As noted above with regard to element 520, in some embodiments, metadata may be stored along with data from a data object in data blocks in the fixed-size data storage area of a data store. FIG. 6A is a high-level flowchart of a method to divide a data object into equally-sized portions including metadata, according to some embodiments. As before, a data object may be received, indicated at 610, to be stored at a data store. The data object may be divided into equally-sized initial portions of data from the data object, as indicated at 620.

These initial portions may be determined by subtracting the size of metadata to be stored with the initial portion of data from the minimum write size of the data store. For example, if the minimum write size of the data store is 4 kilobytes (4112 bytes) and the size of metadata to be stored with the initial portion of data is 112 bytes, then the initial portion of data may be 4000 bytes. This may ensure that the sum of the size of the initial portion (4000 bytes) and the size of the metadata (112 bytes) equals the minimum write size (4112 bytes). For each equally-sized initial portion, metadata may then be obtained. As discussed above, metadata may generally be any information associated with the data stored in the data block, such as a time stamp, source identifier, or error detection data (e.g., CRC). In some embodiments this metadata may be generated to describe the data of the equally-sized initial portion that is to be stored along with the equally-sized initial portion. For example, a CRC value may be calculated for the equally-sized initial portion to detect data corruption. Then, the equally-sized initial portions of the data object may be stored with their respective metadata as one or more equally-sized portions in one or more data blocks of the fixed-size data storage area of the data store, as indicated at 640.

FIG. 6B is a block diagram illustrating equally-sized portions of a divided data object including metadata, according to some embodiments as discussed with regard to FIG. 6A. A data object 650 that is to be stored at a data store may be divided into initial equally-sized portions, as illustrated by the dotted lines on data object 650. (Note that a remainder portion is illustrated as well.) Divided data object 652 illustrates each of these divisions, showing the equally-sized initial portions 684a, 686a, and 688a. The darkened areas 684b, 686b, and 688b, represent the storage space for metadata that will be obtained for the equally-sized initial portions 684a, 686a, and 688a respectively. The remainder 680 is also shown. Equally-sized initial portions of data are stored in a data block along with the generated metadata in fixed-size data storage area 660. Thus, as illustrated, equally-sized initial portion 684a and metadata the size of 684b are stored in data block 694, equally-sized initial portion 686a and metadata the size of 686b are stored in data block 696, and equally-sized initial portion 688a and metadata the size of 688b are stored in data block 698. The remainder, as discussed in previous techniques is stored in a part of a data block 690 in variably-sized data storage area 670. In some embodiments, the remainder 680 stored in variably-sized data storage area 670 may be linked to the equally-sized portions 694-698 of the data object 650 as illustrated by the dotted line from 690 to 694-698 respectively.

Please note, that by including metadata in the data blocks of the fixed-size data storage area, a data object that is not variably-sized that would have completely filled one or more storage blocks, may be modified to be variably-sized when including storage space for metadata. For example, if a 16 kilobyte data object is received at a data store for storage into fixed-sized data blocks equivalent to 4 kilobytes, then the data object is not variably-sized as it would leave no remainder when stored into 4 data blocks. However, if 112 bytes of metadata are included for each data block in the fixed-size data storage area, then 448 bytes (112 bytes*4 data blocks) may be remaining to be stored.

Figure 7:
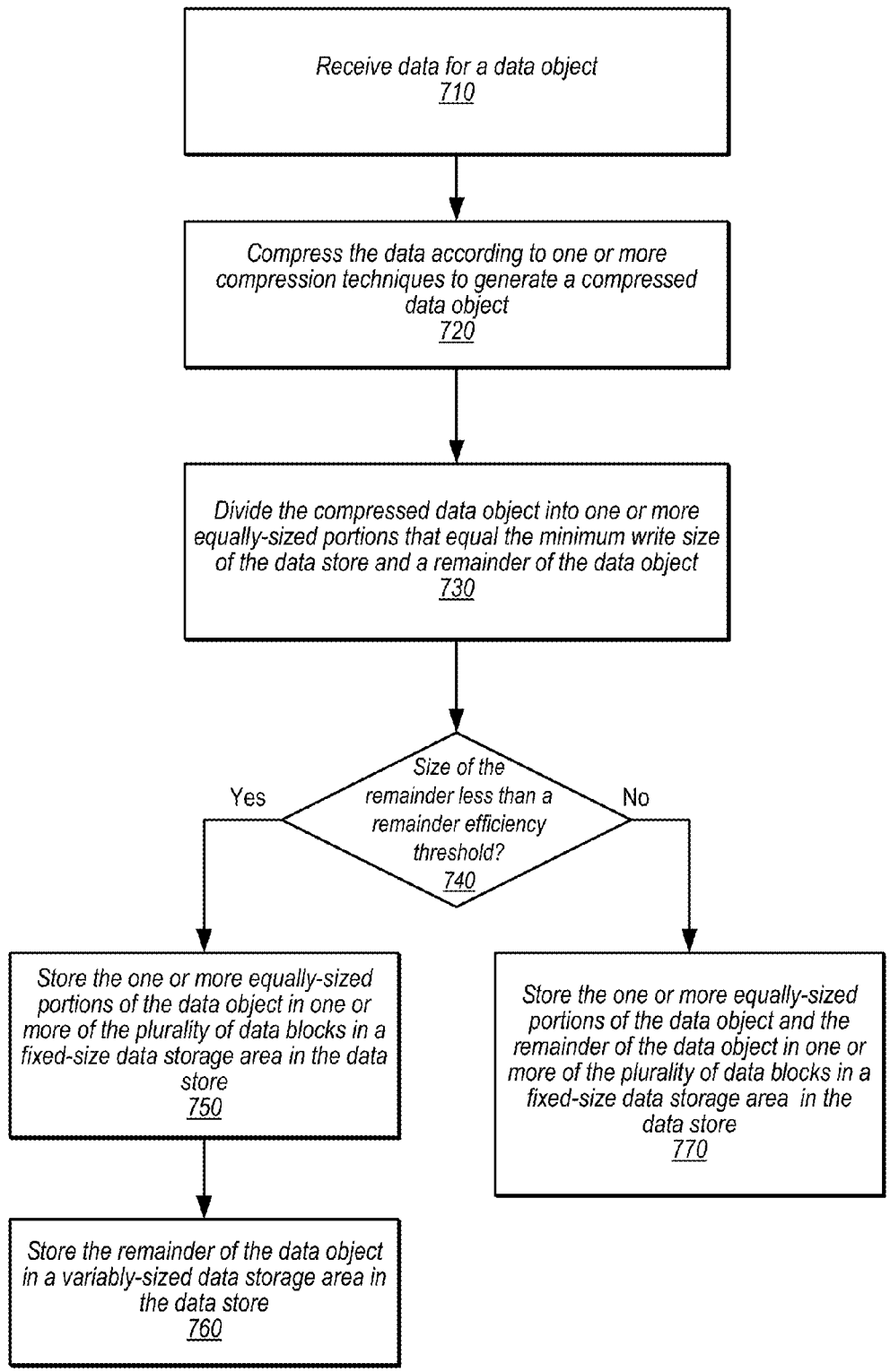
FIG. 7 is a high-level flowchart of a method to efficiently store a variably-sized, compressed data object in a data store, according to some embodiments.

Another example of a way in which data for a data object may be modified to be variably-sized is illustrated in FIG. 7. FIG. 7 is a high-level flowchart of a method to efficiently store variably-sized, compressed data object in a data store, according to some embodiments. Data for a data object may be received, as indicated at 710. This data may be received from a storage client, such as storage client 300 in FIG. 3, or internally from another module or component in the data store. This data may be compressed according to one or more compression techniques to generate a compressed data object, as indicated at 720. The compression techniques applied may be specified by a storage client or other user, or they may be determined at the data store using a variety of different techniques to determine the compact compression to be achieved. As discussed above, in some embodiments data received for a data object to be stored may not be variably-sized, that is it may be exactly divisible into one or more data blocks. However, after one or more compression techniques are applied to the data for the data object, the compressed data object may be variably-sized (e.g., 16 kilobyte data compressed into an 11 kilobyte compressed data object). Similar to element 520 in FIG. 5, the compressed data object may be divided into one or more equally-sized portions that equal the minimum write size of the data store and a remainder of the data object, as indicated at 730.

In some embodiments, the size of the remainder may be examined to determine whether the remainder is less than a remainder efficiency threshold, as indicated at 740. For example, a remainder efficiency threshold may be a certain size or percentage of data block (and thus may be a percentage of the minimum write size of the data store). For those remainders that are not less than the remainder efficiency threshold, then the remainder may be stored in a data block in the fixed-size data storage area of the data store along with the equally-sized portions of the data object, as indicated at 770. Alternatively, if the remainder is less than the remainder efficiency threshold, then the remainder may be stored in the variably-sized data storage area in the data, as indicated at 760, while the one or more equally-sized portions of the data object may be stored in the fixed-size data storage area, as indicated at 750.

Although FIG. 7 illustrates receiving data for a data object at 710 and then compressing the data at 720, a variety of other different processes, techniques, manipulations, or modifications may be made to data received for a data object 710 instead of, or in addition to compressing the data. For example, in some embodiments, data may be received for a data object, and then the data may be encrypted according to one of various encryption techniques, such as one or more various, symmetric or asymmetric encryption techniques. This encrypted data object may then be divided into one or more equally-sized portions that equal the minimum write size of the data store and a remainder of the data object, as indicated at 730.

A remainder efficiency threshold may be determined, in at least some embodiments. This determination may be made based on the available storage in the fixed-size data storage area or the variably-sized data storage area. For example, if the variably-sized data storage area is running low on available storage space, then the remainder efficiency threshold may be lowered, causing more remainders to be stored in the fixed-size data storage area of the data store. Alternatively, if the fixed-size data storage area is running low on available storage space, then the remainder efficiency threshold may be raised, causing more remainders to be stored in the variably-sized data storage area in the data store. As various different schemes and mechanisms may be used to determine the remainder efficiency threshold, the above examples are not intended to be limiting.

Figure 8:
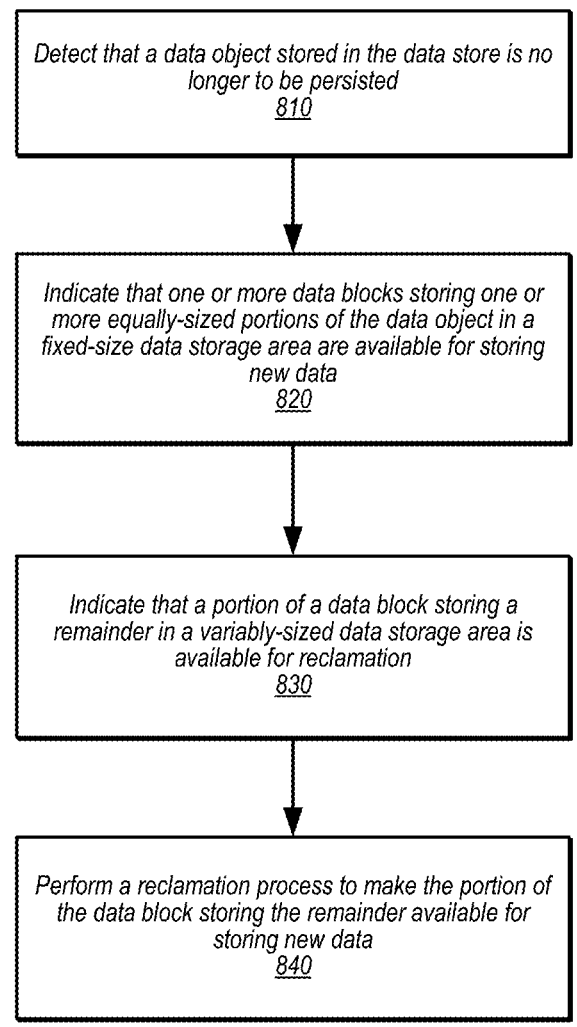
FIG. 8 is a high-level flowchart of a method to make storage space for a data object available to store new data, according to some embodiments.

As variably-sized data objects may now be stored in both a fixed-size data storage area and a variably-sized data storage area, a variety of different reclamation processes and techniques may be performed to make storage space used to store a data object available when the space is no longer to be persisted. FIG. 8 is a high-level flowchart of a method to make storage space for a data object available to store new data, according to some embodiments. As indicated at 810, it may be detected that a data object stored in the data store is no longer to be persisted. This may occur as a result of a request from a storage client, (e.g., a data value is to be deleted), or may occur as part of a storage management function performed, such as the creation of a new data object that represents the data of the old data object (e.g., a coalesce operation combining multiple log records into one log record).

In response to detecting that the data object is to no longer be persisted, the one or more data blocks storing the equally-sized portions of the data object in the fixed-size data storage area may be indicated as available for storing new data, as indicated at 820. Various techniques to make this indication may be implemented. For example, a change in a record or notation in mapping information that describes free and in use data blocks for the data store may be used to indicate that the one or more data blocks are now available for new data. As the one or more data blocks in the fixed-size data storage area may only store data for one data object in each data block, the data block may be immediately available for new data without any formatting, garbage collection, or other data management operations. It may also be indicated that the portion of the data block storing a remainder of the data object may be available for reclamation, as indicated at 830. Similar to the indication discussed above at 820, various techniques may include changing a record or notation in mapping information that describes free and in use storage within data blocks for the data store.

In at least some embodiments, a reclamation process may be performed to make portions of data in the variably-sized data storage area available for storing new data, as indicated at 840. A reclamation process may include many different types of garbage collection, rebalancing, and/or rearranging data techniques for the variably-sized data storage area. For example, a group of data blocks (e.g., a page) in the variably-sized data storage area may be monitored for freed storage space, such as storage space that previously stored remainders or other data portions that are no longer to be persisted. When a reclamation threshold of freed space is exceeded, a reclamation process that compacts the data still to be persisted together in one or more different data blocks in another group of data blocks, so that the data blocks in the former group may all be made available for storing new data. This process may be performed in the background, while other process such as storing recently received data blocks, or servicing data access requests may be performed as foreground processes. As garbage collection, rebalancing, re-compacting, and various other reclamation techniques for making data storage available for new data are well-known to those of ordinary skill in the art, the previous examples are not intended to be limiting.

FIGS. 5 through 8, represent some of the many different methods and techniques for implementing efficient storage of variably-sized data objects, in various embodiments. They are not to be construed as limited to a particular arrangement or ordering of their elements. Similarly, multiple techniques may be performed together, for example, the compression techniques illustrated in FIG. 7 may be performed prior toward the techniques described in FIG. 6A to included metadata in a fixed-size data blocks. Likewise portions of the techniques, such as the remainder efficiency threshold determination illustrated in FIG. 7 may be implemented as part of other techniques, such as the method illustrated in FIG. 5.

Figure 9:
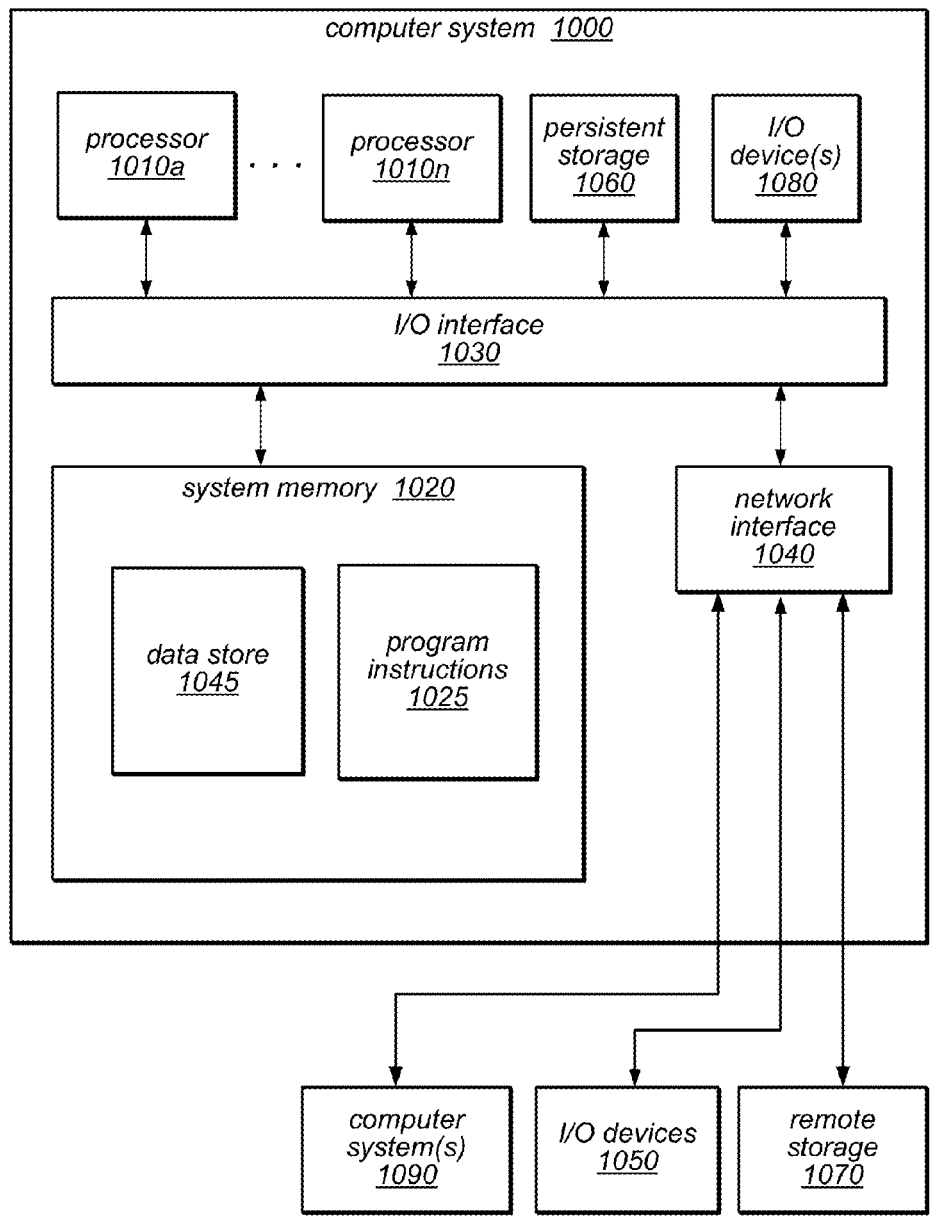
FIG. 9 is a block diagram illustrating a computer system configured to implement at least a portion of a database system that includes a database engine and a separate distributed database storage service, according to various embodiments.

FIG. 9 is a block diagram illustrating a computer system configured to implement at least a portion of the database systems or storage systems described herein, according to various embodiments. For example, computer system 1000 may be configured to implement a database engine head node of a database service, or one of a plurality of storage nodes of a separate distributed storage system that stores database tables and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database service (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage service (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/ IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database service may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
 a storage node of a distributed storage service, comprising:
  at least one persistent data storage device, comprising a plurality of data blocks equivalent to a minimum write size of the at least one persistent storage device;
  a storage node management module, configured to:
   receive a data object for storage at the storage node;
   divide the data object into one or more equally-sized portions and a remainder, wherein each of the one or more equally-sized portions equal the minimum write size of the at least one persistent data storage device;
   store each of the one or more equally-sized portions of the data object in a respective data block of the plurality of data blocks in a fixed-size data storage area on the persistent data storage device; and
   store the remainder of the data object in a variably-sized data storage area on the persistent data storage device, wherein the remainder is linked to the one or more data blocks storing the one or more equally-sized portions of the data object, wherein the variably-sized data storage area stores a plurality of other data portions, wherein at least some of the other data portions are stored together with the remainder in a same data block of the plurality of data blocks in the variably-sized data storage area.

2. The system of claim 1, wherein the storage node management module is further configured to:
receive data for the data object; and
compress the received data for the data object according to one or more compression techniques to generate a compressed data object;
wherein the compressed data object is the received data object.

3. The system of claim 1, wherein, to divide the data object into the one or more equal-sized portions that equal the minimum write size of the at least one persistent data storage device and the remainder of the data object, the storage management module is configured to:
divide the data object into one or more equally-sized initial portions of the data object such that for each of the one or more equally-sized initial portions of the data object a sum of a size of the equally-sized initial portion and a metadata portion is equivalent to the minimum write size of the at least one persistent data storage device; and
for each of the one or more equally-sized initial portions, obtain the metadata to include with the equally-sized initial portion in order to generate the one or more equally-sized portions of the data object.

4. The system of claim 1, wherein the remainder is stored as a log record, and wherein the plurality of other data portions stored in the variably-sized storage area are a plurality of other log records.

5. A method, comprising:
performing, by one or more computing devices:
receiving a data object for storage in a data store, wherein said data store comprises a plurality of data blocks equivalent to a minimum write size for the data store;
dividing the data object into one or more equally-sized portions and a remainder, wherein each of the one or more equally-sized data portions equal the minimum write size of the data store;
storing each of the one or more equally-sized portions of the data object in a respective data block of the plurality of data blocks in a fixed-size data storage area in the data store; and
storing the remainder of the data object in a variably-sized data storage area in the data store, wherein the remainder is linked to the one or more equally-sized portions of the data object stored in the fixed-size data storage area, wherein the variably-sized data storage area stores a plurality of other data portions, wherein at least some of the other data portions are stored together with the remainder in a same data block of the plurality of data blocks.

6. The method of claim 5, further comprising:
receiving data for the data object; and
encrypting the received data for the data object according to an encryption technique to generate an encrypted data object;
wherein the encrypted data object is the received data object.

7. The method of claim 5, wherein said dividing the data object into one or more equally-sized portions and a remainder of the data object comprises:

determining that a size of the remainder of the data object is less than a remainder efficiency threshold.

8. The method of claim 7, wherein said dividing the data object into one or more equally-sized portions and a remainder of the data object further comprises:
determining the remainder efficiency threshold based, at least in part, on available storage in the fixed-size data storage area or available storage in the variably-sized data storage area.

9. The method of claim 5, further comprising:
receiving data for the data object; and
compressing the received data for the data object according to one or more compression techniques to generate a compressed data object;
wherein the compressed data object is the received data object.

10. The method of claim 5, wherein said dividing the data object into one or more equally-sized portions and a remainder of the data object comprises:
dividing the data object into one or more equally-sized initial portions of the data object such that for each of the one or more equally-sized initial portions of the data object a sum of a size of the equally-sized initial portion and a size of a metadata portion is equivalent to the minimum write size of the data store; and
for each of the one or more equally-sized initial portions, obtaining the metadata to include with the equally-sized initial portion in order to generate the one or more equally-sized portions of the data object.

11. The method of claim 5, further comprising:
upon detecting that the data object is to no longer be persisted:
indicating that the respective data blocks storing the one or more equally-sized portions of the data object in the fixed-size data storage area are available for storing new data; and
indicating that a portion of the data block storing the remainder in the variably-sized data storage area is available for reclamation.

12. The method of claim 11, wherein different ones of the plurality of other data portions are indicated as available for reclamation, wherein the method further comprises:
performing a reclamation process to arrange contiguously those data portions of the plurality of other data portions in the variably-sized data storage area that are not indicated as available for reclamation such that the data block storing the indicated remainder of the data object is available for storing new data.

13. The method of claim 12, wherein the reclamation process is performed as a background process.

14. The method of claim 5, wherein the one or more computing devices together implement a storage node of a distributed storage service, and wherein the data object is received from a client of the distributed storage service for storage at the storage node.

15. A non-transitory, computer-readable storage medium, storing program instructions that when executed by one or more computing devices implement:
receiving a data object for storage in a data store, wherein said data store comprises a plurality of data blocks equivalent to a minimum write size for the data store;
dividing the data object into one or more equally-sized portions and a remainder, wherein each of the one or more equally-sized portions equal the minimum write size of the data store;

storing each of the one or more equally-sized portions of the data object in a respective data block of the plurality of data blocks in a fixed-size data storage area in the data store; and storing the remainder of the data object in a variably-sized data storage area in the data store, wherein the remainder is linked to the one or more equally-sized portions of the data object stored in the fixed-size data storage area, wherein the variably-sized data storage area stores a plurality of other data portions, wherein at least some of the other data portions are stored together with the remainder in a same data block of the plurality of data blocks.

16. The non-transitory, computer-readable storage medium of claim 15, wherein the program instructions when executed by the one or more computing devices further implement:

receiving data for the data object; and compressing the received data for the data object according to one or more compression techniques to generate a compressed data object;

wherein the compressed data object is the received data object.

17. The non-transitory, computer-readable storage medium of claim 15, wherein, in said dividing the data object into the one or more equally-sized portions and the remainder, the program instructions when executed by the one or more computing devices further implement:

dividing the data object into one or more equally-sized initial portions of the data object such that for each of the one or more equally-sized initial portions of the data object a sum of a size of the equally-sized initial portion and a size of a metadata portion is equivalent to the minimum write size of the data store; and for each of the one or more equally-sized initial portions, generating the metadata to include with the equally-sized initial portion in order to generate the one or more equally-sized portions of the data object.

18. The non-transitory, computer-readable storage medium of claim 15, wherein the program instructions when executed by the one or more computing devices further implement:

receiving another data object for storage;

dividing the other data object into one or more other equally-sized portions and another remainder, wherein each of the one or more other equally-sized portions equal the minimum write size of the data store;

determining that a size of the other remainder of the other data object exceeds a remainder efficiency threshold; and storing each of the other one or more equally-sized portions of the other data object and the other remainder of the other data object in a respective data block of the plurality of data blocks in the fixed-size data storage area in the data store.

19. The non-transitory, computer-readable storage medium of claim 15, wherein the link between the remainder and the one or more the one or more equally-sized portions of the data object is stored along with the remainder in the variably-sized data storage area.

20. The non-transitory, computer-readable storage medium of claim 15, wherein the fixed-size data storage and the variably-sized data storage are implemented together as part of a single persistent storage device.

* * * * *